US008554449B2

(12) United States Patent
Yokoyama et al.

(10) Patent No.: US 8,554,449 B2
(45) Date of Patent: Oct. 8, 2013

(54) FUEL INJECTION CONTROL APPARATUS

(75) Inventors: Shinji Yokoyama, Shioya-gun (JP);
Ikuhiro Uemura, Utsunomiya (JP);
Hiroyuki Hayasaka, Shioya-gun (JP);
Akinori Takehara, Utsunomiya (JP)

(73) Assignee: Keihin Corporation (JP)

( * ) Notice: Subject to any disclaimer, the term of this patent is extended or adjusted under 35 U.S.C. 154(b) by 510 days.

(21) Appl. No.: 12/912,271

(22) Filed: Oct. 26, 2010

(65) Prior Publication Data

US 2011/0100330 A1    May 5, 2011

(30) Foreign Application Priority Data

Oct. 29, 2009 (JP) ................ 2009-249134

(51) Int. Cl.
*F02D 41/06* (2006.01)
*F02M 51/00* (2006.01)

(52) U.S. Cl.
USPC .............. 701/105; 123/478; 123/299

(58) Field of Classification Search
USPC .............. 701/103–105, 102; 123/299, 300, 123/478, 480, 486
See application file for complete search history.

(56) References Cited

U.S. PATENT DOCUMENTS

| 4,911,132 | A * | 3/1990 | Nakaniwa et al. ............ 123/478 |
| 6,044,824 | A * | 4/2000 | Mamiya et al. ............... 123/491 |
| 6,843,753 | B2 * | 1/2005 | Kishibata et al. ............... 477/91 |
| 7,252,069 | B2 * | 8/2007 | Date et al. ..................... 123/299 |
| 7,765,053 | B2 * | 7/2010 | Gwidt et al. .................. 701/104 |
| 8,175,789 | B2 * | 5/2012 | Kojima et al. ................ 701/104 |
| 2009/0326788 | A1 * | 12/2009 | Yuasa et al. .................... 701/104 |

FOREIGN PATENT DOCUMENTS

| JP | 9-242586 A | 9/1997 |
| JP | 11270388 A | 10/1999 |
| JP | 2006090230 A | 4/2006 |

OTHER PUBLICATIONS

JP Office Action with English Translation for Application No. 2009-249134.; Ref. No. J55944A1; Mailing No. 424084; Mailing Date: Jul. 2, 2013; 4 pgs.

* cited by examiner

*Primary Examiner* — Hieu T Vo
(74) *Attorney, Agent, or Firm* — Cantor Colburn LLP

(57) ABSTRACT

A fuel injection control apparatus for controlling a fuel injection valve including an arithmetic processing section that determines whether a necessary fuel amount is injectable or not within a fuel injectable range from a first fuel injection start timing, computes a second fuel injection start timing in which the necessary fuel amount is injectable within the fuel injectable range in the case that it is not injectable, and controls the fuel injection valve at the computed second fuel injection start timing so as to start fuel injection.

4 Claims, 4 Drawing Sheets

FUEL INJECTION CONTROL APPARATUS

Priority is claimed on Japanese Patent Application No. 2009-249134, filed on Oct. 29, 2009, the contents of which are incorporated herein by reference.

BACKGROUND OF THE INVENTION

1. Field of the Invention

The present invention relates to a fuel injection control apparatus.

2. Description of the Related Art

FIG. 4 is a timing chart showing fuel injection states in a fuel injectable range of a four-cycle engine. When an engine starts, a rotation speed of the engine dramatically changes. Thus, when a necessary fuel injection amount (period B-D) is supplied in a fuel injection valve, there is a large difference between engine rotation speed at the time of computing the necessary fuel injection amount and engine rotation speed at the time of actually supplying the fuel. It is difficult to control both a fuel injection start timing (B) and a fuel injection finish timing (D). Also, it is difficult to have the fuel injection finish timing (D) fixed and have the fuel injection start timing (B) variable.

For example, Japanese Unexamined Patent Application, First Publication No. H9-242586 discloses a technique that a fuel injection start timing (injection start timing at starting) at the engine starting can be previously set and at the time of engine starting, fuel is injected only for the injection period corresponding to the rotation number of the engine in which the injection starting timing at the engine starting is a starting point (in other words, the injection start timing is fixed and the injection finish timing is variable).

However, in the case that fuel is alcohol or the like, when a necessary fuel injection amount is largely increased (period B-F), fuel which is not injected (period E-F) over a final end (E: for example, finish timing of the intake stroke) of the fuel injectable range is generated. In order to avoid this, a large capacity fuel injection valve needs to be used so that the injection timing is not over the final end (E) of the fuel injectable range for any necessary fuel injection amount.

However, to satisfy the above-described condition and to be applicable to both gasoline fuel and alcohol fuel, the fuel injection valve having a flow capacity 1.5 times of that needed in the case of gasoline fuel may be used. In this case, there is a problem that controllability becomes worse in terms of the control when gasoline fuel is used. On the other hand, in the case that the fuel injection start timing (B) is advanced to timing A in FIG. 4 to correspond to alcohol fuel in which the necessary fuel injection amount is large, the alcohol fuel can be injected within the fuel injectable range (period A-E). In the case that gasoline fuel in which the necessary fuel injection amount is small, fuel cannot be injected during the intake stroke (period A-C). Thus, there is a problem that performance of the engine worsens.

In view of the aspects described above, an object of the present invention is to provide a fuel injection control apparatus in which the fuel injection can be performed at an appropriate timing irrespective of the necessary fuel injection amount.

SUMMARY OF THE INVENTION

The present invention adopts the followings in order to solve the problems and thus achieve the associated objects.

(1) A fuel injection control apparatus according to an aspect of the present invention is a fuel injection control apparatus for controlling a fuel injection valve including: an arithmetic processing section that determines whether a necessary fuel amount is injectable or not within a fuel injectable range from a first fuel injection start timing, computes a second fuel injection start timing in which the necessary fuel amount is injectable within the fuel injectable range in the case where the arithmetic processing section determines that the necessary fuel amount is not injectable within the fuel injectable range from the first fuel injection start timing, and the fuel injection valve at the computed second fuel injection start timing so as to start fuel injection.

(2) In the fuel injection control apparatus according to (1) above, in the case where the arithmetic processing section determines that the necessary fuel amount is injectable within the fuel injectable range from the first fuel injection start timing, the arithmetic processing section may control the fuel injection valve at the first fuel injection start timing so as to start fuel injection.

(3) In the fuel injection control apparatus according to (1) above, the fuel injection control apparatus may further include a waveform shaping section that performs waveform shaping of a crank signal that is input from a crank angle sensor to a rectangular wave pulse signal which has a frequency which is a period of time needed to rotate a crankshaft by a predetermined angle. The arithmetic processing section may measure a pulse interval time of the pulse signal, compute an arrival prediction time from the first fuel injection start timing to a final end of the fuel injectable range on the basis of the measured pulse interval time, set a case that the arrival prediction time is shorter than a necessary fuel injection time as the case where the arithmetic processing section determines that the necessary fuel amount is not injectable within the fuel injectable range from the first fuel injection start timing, and compute the second starting timing of fuel injection on the basis of the pulse interval time.

(4) In the fuel injection control apparatus according to (3) above, the arithmetic processing section may compute the arrival prediction time TINJ on the basis of the below formula (1) which consists of the pulse interval time CRME, the first fuel injection start timing INJOBJ1, and the final end TINJEND of the fuel injectable range, and compute the second fuel injection start timing INJOBJ2 on the basis of the below formula (2) which consists of the pulse interval time CRME, the necessary fuel injection time TOUT, and the final end TINJEND of the fuel injectable range.

$$TINJ = (TINJEND - INJOBJ1) \times CRME \quad (1)$$

$$INJOBJ2 = TINJEND - TOUT/CRME \quad (2)$$

According to an embodiment of a fuel injection control apparatus of the present invention, because the fuel injection control apparatus determines whether a necessary fuel amount is injectable or not within a fuel injectable range from a first fuel injection start timing, computes a second fuel injection start timing in which the necessary fuel amount is injectable within the fuel injectable range in the case where the arithmetic processing section determines that the necessary fuel amount is not injectable within the fuel injectable range from the first fuel injection start timing, and controls the fuel injection valve at the computed second fuel injection start timing so as to start fuel injection, the fuel injection can be performed at an appropriate timing irrespective of the necessary fuel injection amount.

DETAILED DESCRIPTION OF THE INVENTION

Figure 1:
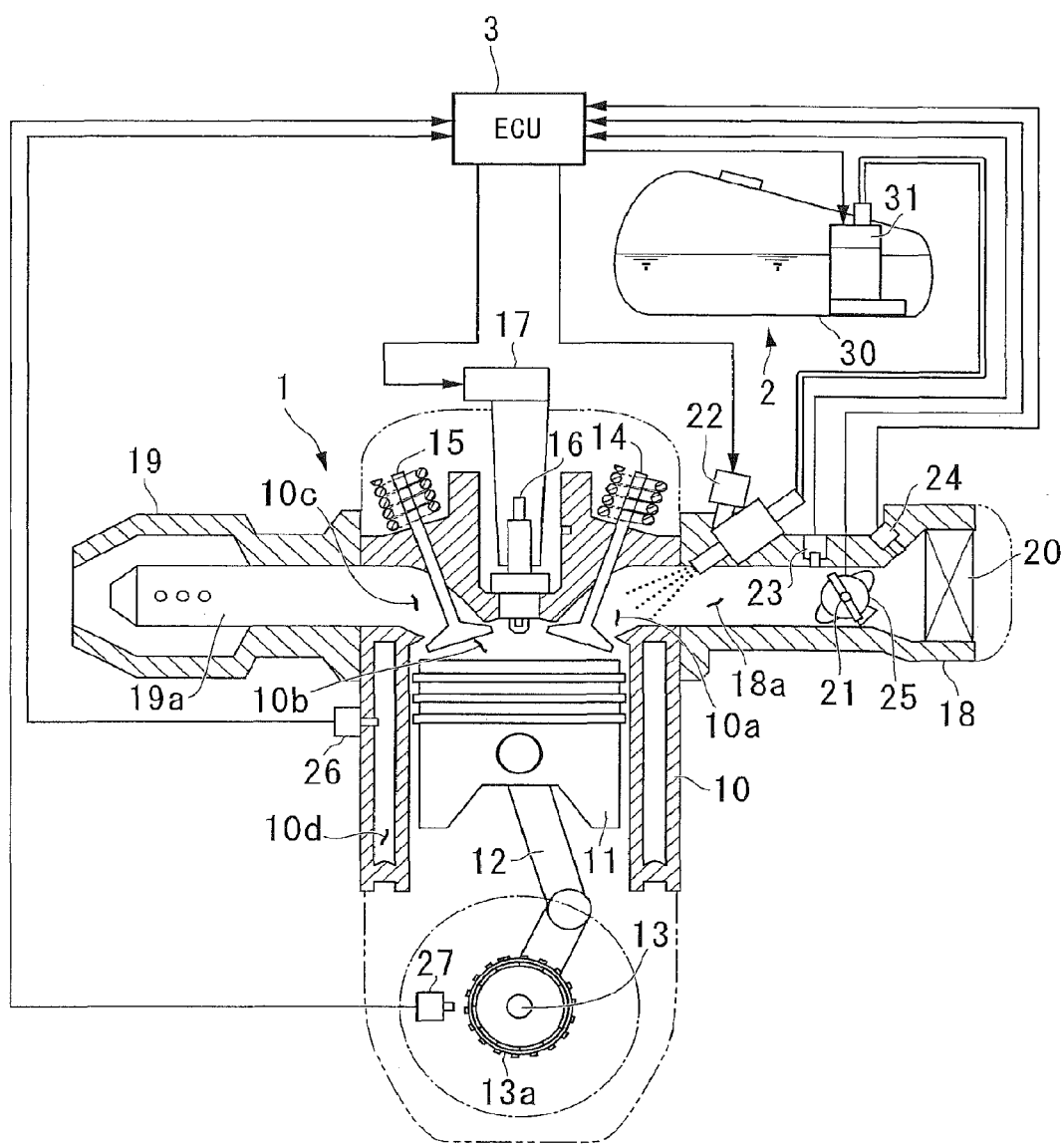
FIG. 1 is a schematic view showing a configuration of an engine control system according to an embodiment of the present invention.

Hereinafter, an embodiment of the present invention will be described referring to the drawings.

FIG. 1 is a schematic view showing a configuration of an engine control system including a fuel injection control apparatus (ECU 3) according to the embodiment. As shown in FIG. 1, the engine control system according to the embodiment schematically constitutes of an engine 1, a fuel supply section 2 and the ECU (Electronic Control Unit) 3.

The engine 1 is a four-cycle engine and is generally constituted of a cylinder 10, a piston 11, a connecting rod 12, a crankshaft 13, an intake valve 14, an exhaust valve 15, a spark plug 16, a ignition coil 17, an intake manifold 18, an exhaust manifold 19, an air cleaner 20, a throttle valve 21, an injector 22, an intake air pressure sensor 23, an intake air temperature sensor 24, a throttle opening degree sensor 25, a cooling water temperature sensor 26 and a crank angle sensor 27.

The cylinder 10 is a hollow cylindrical member within which the piston 11 is provided and the piston 11 is reciprocated by repeating four strokes of intake, compression, combustion (expansion) and exhaust. The cylinder 10 includes an intake port 10*a* that is a flow passage for supplying a mixed gas of air and fuel to a combustion chamber 10*b*, the combustion chamber 10*b* that is a space in which the mixed gas is held and the mixed gas compressed in the compression stroke is combusted during combustion, and a exhaust port 10*c* that is a flow passage for exhausting an exhaust gas during exhaust from the combustion chamber 10*b* to the outside. A cooling water passage 10*d* for circulating the cooling water is provided at an outside wall of the cylinder 10.

A crankshaft 13 for converting a reciprocating motion of the piston 11 to a rotation motion is connected to the piston 11 through the connecting rod 12. The crankshaft 13 extends in an orthogonal direction to the reciprocating direction of the piston 11 and is connected to a flywheel (not shown), a transmission gear or the like. A rotor 13*a* used for detecting a crank angle is also coaxially connected to the crankshaft 13. A plurality of protrusions are provided on an outer peripheral of the rotor 13*a* such that a rear end of each of the protrusions is at an equiangular interval (for example, 20° interval) with respect to the rotation direction.

The intake valve 14 is a valve member to open or close the opening section of the of combustion chamber 10*b* side in the intake port 10*a*. The intake valve 14 is connected to a camshaft (not shown) and is driven to open or close in response to each stroke by the camshaft. The exhaust valve 15 is a valve member to open or close the opening section of the combustion chamber 10*b* side in the exhaust port 10*c*. The exhaust valve 15 is connected to a camshaft (not shown) and is driven to open or close in response to each stroke by the camshaft.

The spark plug 16 is provided on the uppermost section of the combustion chamber 10*b* with electrodes thereof facing the combustion chamber 10*b* side and generates a spark between the electrodes in accordance with a high voltage signal supplied from the ignition coil 17. The ignition coil 17 is a transformer including a first winding wire and a second winding wire, and boosts a voltage signal for ignition that is supplied to the first winding wire from the ECU 3, and thus supplies the voltage to the spark plug 16 from the second winding wire.

The intake manifold 18 is a manifold for supplying air and is connected to the cylinder 10 so that an intake flow passage 18*a* in the intake manifold 18 is linked with the intake port 10*a*. The exhaust manifold 19 is a manifold for releasing the exhaust gas and is connected to the cylinder 10 so that an exhaust flow passage 19*a* in the exhaust manifold 19 is linked with the exhaust port 10*c*. The air cleaner 20 is provided on an upstream side of the intake manifold 18 and cleans air incoming from the outside to sends it to the intake flow passage 18*a*.

The throttle valve 21 is provided in the inside of the intake flow passage 18*a* and is rotated by the throttle (or accelerator) (not shown). In other words, a cross sectional area of the intake flow passage 18*a* is changed by turning of the throttle valve 21 and the intake amount is changed. The injector (a fuel injection valve) 22 is provided in the intake manifold 18 in such a manner that a injection opening thereof is directed to the intake port 10*a* side, and injects from the injection opening fuel supplied from the fuel supply section 2 in accordance with an injector driving signal supplied from the ECU 3.

The intake air pressure sensor 23 is a semiconductor pressure sensor using, for example, a piezo resistance effect and is provided in the intake manifold 18 in such a manner that a sensing surface thereof is directed to the intake flow passage 18*a* in a downstream side of the throttle valve 21. The intake air pressure sensor 23 outputs an intake air pressure signal to the ECU 3 in accordance with the intake air pressure in the intake manifold 18. The intake air temperature sensor 24 is provided in the intake manifold 18 in such a manner that a sensing section thereof is directed to the intake flow passage 18*a* in an upstream of the throttle valve 21. The intake air temperature sensor 24 outputs an intake air temperature signal to the ECU 3 in accordance with the intake air temperature in the intake manifold 18. The throttle opening degree sensor 25 outputs a throttle opening signal to the ECU 3 in accordance with the opening degree of the throttle valve 21.

The cooling water temperature sensor 26 is provided in such a manner that a sensing section thereof is directed to the cooling water passage 10*d* of the cylinder 10 and outputs a cooling water temperature signal to the ECU 3 in accordance with the temperature of the cooling water that flows in the cooling water passage 10*d*. The crank angle sensor 27 is, for example, an electromagnetic-type pickup sensor and outputs a pair of pulse signals the polarity of which is different at each time that each protrusion, which is provided on an outer peripheral of the rotor 13*a*, passes near the sensor to the ECU 3. More specifically, the crank angle sensor 27 outputs the pulse signal with an amplitude of a negative polarity in the case that a front end of a protrusion passes in the rotation direction, and the crank angle sensor 27 outputs a pulse signal having an amplitude of a positive polarity in the case that a rear end of a protrusion passes in the rotation direction.

The fuel supply section 2 consists of a fuel tank 30 and a fuel pump 31. The fuel tank 30 is a container for holding fuel such as gasoline fuel or alcohol fuel. The fuel pump 31 is provided within the fuel tank 30 and pumps out the fuel within the fuel tank 30 so as to supply it to the injector 22 in accordance with a pump driving signal that is input from the ECU 3.

Figure 2:
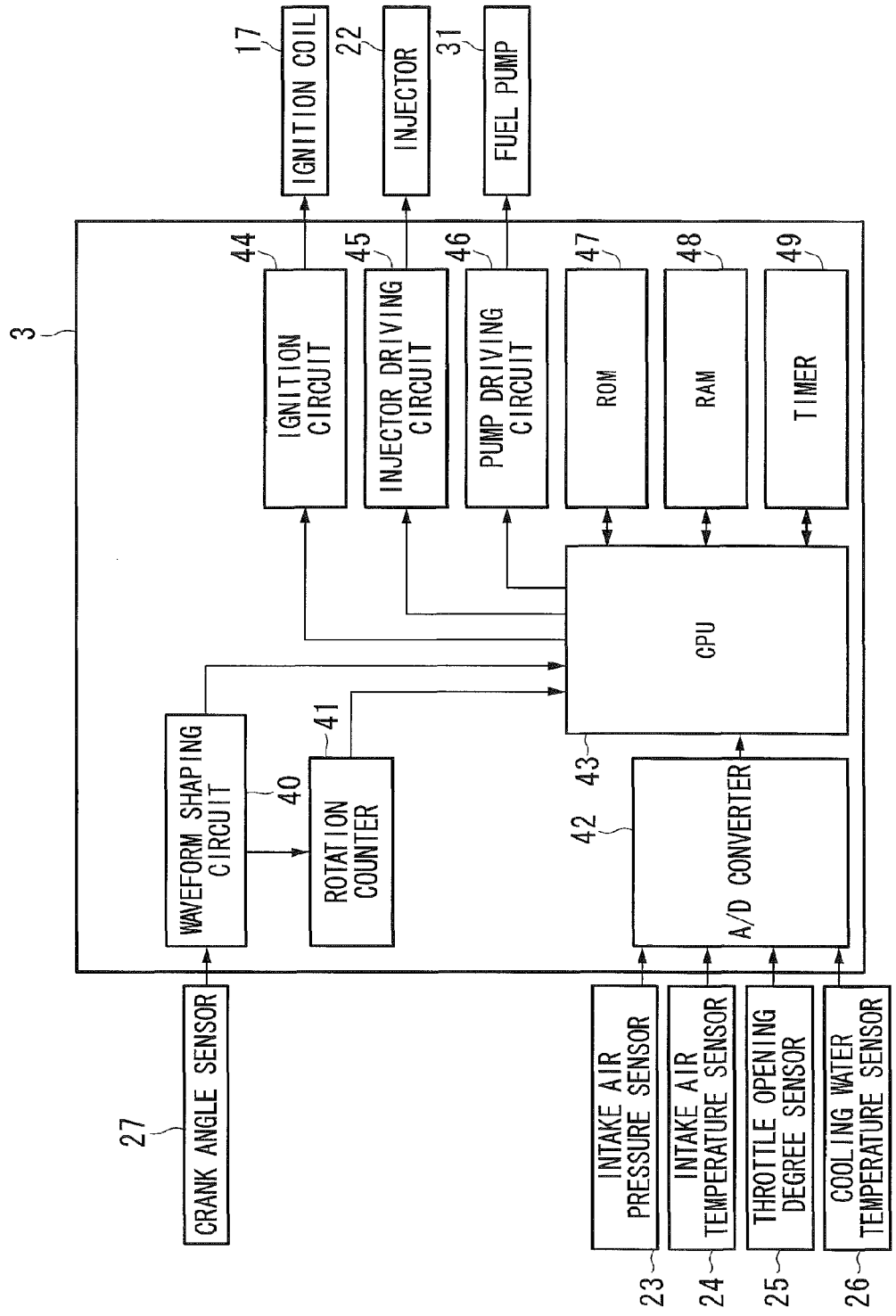
FIG. 2 is a block diagram showing a fuel injection control apparatus (ECU 3) according to the embodiment.

The ECU 3 is a unit that generally controls the overall operations of an engine control system, and as shown in FIG. 2, includes a waveform shaping circuit 40, a rotation counter 41, an A/D (Analog and Digital) converter 42, a CPU (Central Processing Unit) 43, an ignition circuit 44, an injector driving circuit 45, a pump driving circuit 46, a ROM (Read Only Memory) 47, a RAM (Random Access Memory) 48 and a timer 49.

The waveform shaping circuit 40 (a waveform shaping section) performs waveform shaping of a crank signal that is input from the crank angle sensor 27 to a rectangular wave pulse signal (for example, assuming that the crank signal of the negative polarity is set to be a high level and the crank signal of the positive polarity or a ground level is set to be a low level), and outputs the rectangular wave pulse signal to the rotation counter 41 and the CPU 43. In other words, the rectangular wave pulse signal is a pulse signal of the square wave which has a frequency which is the period of time necessary for the crankshaft 13 to rotate 20°. Hereinafter, the rectangular wave pulse signal that is output from the waveform shaping circuit 40 is referred to as a crank pulse signal.

The rotation counter 41 computes the engine speed on the basis of the crank pulse signal that is input from the waveform shaping circuit 40 and outputs the rotation number signal that indicates the engine speed to the CPU 43. The A/D converter 42 converts the intake air pressure signal that is input from the intake air pressure sensor 23, the intake air temperature signal that is input from the intake air temperature sensor 24, the throttle opening signal that is input from the throttle opening degree sensor 25 and the cooling water temperature signal that is input from the cooling water temperature sensor 26 to digital signals (an intake air pressure value, an intake air temperature value, a throttle opening value and a cooling water temperature value) and outputs them to the CPU 43.

The CPU 43 (arithmetic processing section) performs an engine control program stored in the ROM 47 and controls the fuel injection, the ignition and the fuel supply of the engine 1 on the basis of the crank pulse signal that is input from the waveform shaping circuit 40, the rotation number signal that is input from the rotation counter 41, the intake air pressure value, the intake air temperature value, the throttle opening value and the cooling water temperature value which are converted by the A/D converter 42. Specifically, the CPU 43 outputs the ignition control signal that sparks the spark plug 16 at the ignition timing to the ignition circuit 44. The CPU 43 outputs the fuel injection control signal for injecting a predetermined fuel amount from the injector 22 at the fuel injection timing to the injector driving circuit 45. The CPU 43 outputs a fuel supply control signal for supplying the fuel to the injector 22 and then to the pump driving circuit 46.

The ignition circuit 44 includes a condenser that accumulates power supply voltage supplied from a battery (not shown) and discharges an electric charge that is accumulated in the condenser to the first winding wire of the ignition coil 17 as a voltage signal for ignition in accordance with the ignition control signal that is input from the CPU 43. The injector driving circuit 45 generates the injector driving signal for driving the injector 22 and outputs the injector driving signal to the injector 22 in accordance with the fuel injection control signal that is input from the CPU 43. The pump driving circuit 46 generates the pump driving signal for driving the fuel pump 31 and outputs the pump driving signal to the fuel pump 31 in accordance with the fuel supply control signal that is input from the CPU 43.

The ROM 47 is a nonvolatile memory that stores in advance the engine control program and various set-up data that is performed by the CPU 43. The RAM 48 is a volatile working memory that is used as a temporary data destination when the CPU 43 performs the engine control program and various operations. The timer 49 performs a time count operation under the control by the CPU 43, and outputs results thereof (the time count value) to the CPU 43.

Figure 3:
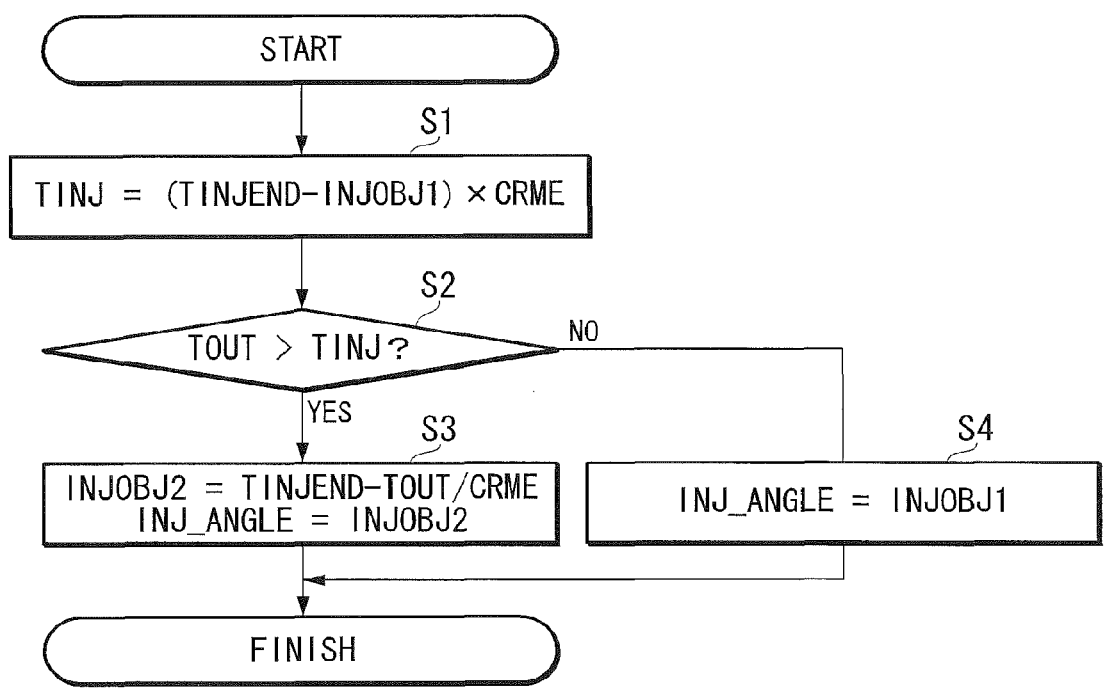
FIG. 3 is a flowchart showing a set-up process of a fuel injection start timing that is performed by a CPU 43 of an ECU 3.

Then, the operation of the ECU 3 will be described in the engine control system with above described configuration. FIG. 3 is a flowchart showing a set-up process of the fuel injection start timing that is performed by the CPU 43 of the ECU 3. As shown in FIG. 3, the CPU 43 controls the timer 49, measures a pulse interval time of the crank pulse signal that is input from the waveform shaping circuit 40, and then computes an arrival prediction time TINJ from a first fuel injection start timing to a final end of a fuel injectable range on the basis of the measured pulse interval time (step S1).

Specifically, the CPU 43 computes the arrival prediction time TINJ on the basis of the below formula (1) which consists of the pulse interval time CRME, the first fuel injection start timing INJOBJ1, and the final end TINJEND of the fuel injectable range.

$$TINJ = (TINJEND - INJOBJ1) \times CRME \qquad (1)$$

Figure 4:
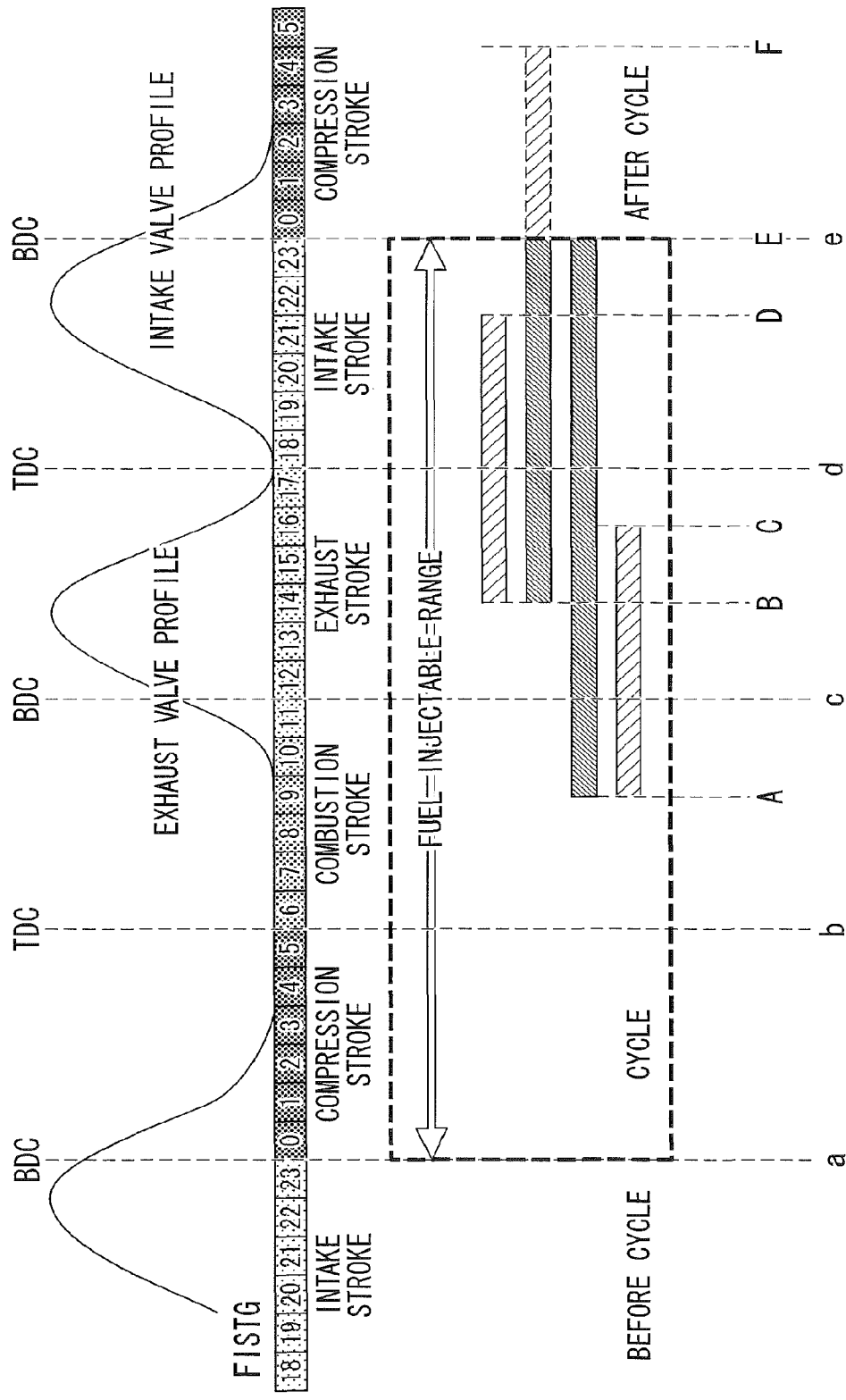
FIG. 4 is a timing chart showing fuel injection states in a fuel injectable range of a four-cycle engine.

The first fuel injection start timing INJOBJ1 is previously set at a fuel injection start timing (timing B in FIG. 4) that is suitable for gasoline fuel. The final end TINJEND of the fuel injectable range is previously set at the timing E in FIG. 4.

The first fuel injection start timing INJOBJ1 and the final end TINJEND of the fuel injectable range are set at the rotation angle of the crankshaft 13. Also, the pulse interval time CRME indicates a time needed to rotate the crankshaft 13 to 20°. In other words, the arrival prediction time TINJ derived from the formula (1) is a time needed to rotate from the first fuel injection start timing INJOBJ1 to the final end TINJEND of the fuel injectable range in the current rotation speed of the engine 1.

Subsequently, the CPU 43 determines whether or not the arrival prediction time TINJ computed at the step S1 is shorter than the necessary fuel injection time TOUT (step S2). The necessary fuel injection time TOUT is a time needed to inject the necessary fuel amount and is the time between B and D in FIG. 4 in the case of gasoline fuel, and is the time between B and F in FIG. 4 in the case of alcohol fuel. The necessary fuel injection time TOUT is computed by an additional routine on the basis of the kind of currently used fuel and the current rotation speed of the engine 1.

In the step S2, in case of "Yes", in other words, in the case that the arrival prediction time TINJ is shorter than the necessary fuel injection time TOUT (that is to say, in the case that the currently used fuel is alcohol fuel and the necessary fuel amount can not be injected within the fuel injectable range from the first fuel injection start timing INJOBJ1), the CPU 43 computes the second fuel injection start timing INJOBJ2 so that the necessary fuel amount can be injected within the fuel injectable range, and sets the second fuel injection start timing INJOBJ2 as a final fuel injection start timing INJ_ANGLE (step S3).

Specifically, the CPU 43 computes the second fuel injection start timing INJOBJ2 on the basis of the below formula (2) which consists of the pulse interval time CRME, the necessary fuel injection time TOUT, and the final end TINJEND of the fuel injectable range.

$$INJOBJ2 = TINJEND - TOUT/CRME \qquad (2)$$

In the formula (2), "TOUT/CRME" indicates an angle change amount when the engine 1 rotates only the necessary fuel injection time TOUT in the current rotation speed of the engine 1. By subtracting this value from the final end TINJEND of the fuel injectable range, the second fuel injection start timing INJOBJ2 (timing A in FIG. 4 when the currently used fuel is alcohol fuel) that can inject the necessary fuel amount within the fuel injectable range can be computed.

On the other hand, in the step S2, in case of "No", in other words, in the case that the arrival prediction time TINJ is the necessary fuel injection time TOUT or more (that is to say, in the case that the currently used fuel is gasoline fuel and the necessary fuel amount can be injected within the fuel injectable range from the first fuel injection start timing INJOBJ1), the CPU 43 sets the first fuel injection start timing INJOBJ1 as the final fuel injection start timing INJ_ANGLE (step S4).

After finishing steps from the step S1 to step S4, the CPU 43 controls the injector 22 at the fuel injection start timing INJ_ANGLE that is set finally and starts the fuel injection. In other words, the CPU 43 starts the fuel injection at the second fuel injection start timing INJOBJ2 that is computed using the formula (2) in the case that the currently used fuel is alcohol fuel and the necessary fuel amount cannot be injected within the fuel injectable range from the first fuel injection start timing INJOBJ1 (in the case that TOUT>TINJ). On the other hand, the CPU 43 starts the fuel injection at the first fuel injection start timing INJOBJ1 that is previously set in the case that the currently used fuel is gasoline fuel and the necessary fuel amount can be injected within the fuel injectable range from the first fuel injection start timing INJOBJ1 (in the case that TOUT≤TINJ).

As described above, according to the embodiment, in the case that the currently used fuel is alcohol fuel and the necessary fuel amount can not be injected within the fuel injectable range from the first fuel injection start timing INJOBJ1, the fuel injection is started at the second fuel injection start timing INJOBJ2 (timing A in FIG. 4) that is more advanced than the first fuel injection start timing INJOBJ1 suitable for gasoline fuel. Accordingly, generation of conventional fuel which is not injected (period E-F in FIG. 4) can be prevented.

Also, in the case that the currently used fuel is gasoline fuel and the necessary fuel amount can be injected within the fuel injectable range from the first fuel injection start timing INJOBJ1, the fuel injection is started at first fuel injection start timing INJOBJ1 (timing B in FIG. 4) suitable for gasoline fuel. Accordingly, the fuel injection can be performed during the intake stroke (period B-D in FIG. 4) and degradation of the engine performance can be prevented.

In other words, according to the ECU 3 (the fuel injection control apparatus) of the embodiment, the fuel injection can be performed at an appropriate timing irrespective of the necessary fuel injection amount.

While preferred embodiment of the invention has been described and illustrated above, it should be understood that this is an exemplary of the invention and is not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A fuel injection control apparatus for controlling a fuel injection valve comprising:
an arithmetic processing section that determines whether a necessary fuel amount is injectable or not within a fuel injectable range from a first fuel injection start timing, computes a second fuel injection start timing in which the necessary fuel amount is injectable within the fuel injectable range in the case where the arithmetic processing section determines that the necessary fuel amount is not injectable within the fuel injectable range from the first fuel injection start timing, and controls the fuel injection valve at the computed second fuel injection start timing so as to start fuel injection.

2. The fuel injection control apparatus according to claim 1, wherein in the case where the arithmetic processing section determines that the necessary fuel amount is injectable within the fuel injectable range from the first fuel injection start timing, the arithmetic processing section controls the fuel injection valve at the first fuel injection start timing so as to start fuel injection.

3. The fuel injection control apparatus according to claim 1, further comprising a waveform shaping section that performs waveform shaping of a crank signal that is input from a crank angle sensor to a rectangular wave pulse signal which has a frequency which is a period of time needed to rotate a crankshaft by a predetermined angle,
wherein the arithmetic processing section measures a pulse interval time of the pulse signal, computes an arrival prediction time from the first of fuel injection start timing to a final end of the fuel injectable range on the basis of the measured pulse interval time, sets a case that the arrival prediction time is shorter than a necessary fuel injection time as the case where the arithmetic processing section determines that the necessary fuel amount is not injectable within the fuel injectable range from the first fuel injection start timing, and computes the second starting timing of fuel injection on the basis of the pulse interval time.

4. The fuel injection control apparatus according to claim 3, wherein the arithmetic processing section computes the arrival prediction time TINJ on the basis of the below formula (1) which consists of the pulse interval time CRME, the first fuel injection start timing INJOBJ1, and the final end TINJEND of the fuel injectable range, and computes the second fuel injection start timing INJOBJ2 on the basis of the below formula (2) which consists of the pulse interval time CRME, the necessary fuel injection time TOUT, and the final end of the fuel injectable range TINJEND.

$$TINJ = (TINJEND - INJOBJ1) \times CRME \quad (1)$$

$$INJOBJ2 = TINJEND - TOUT/CRME \quad (2).$$

* * * * *